UNITED STATES PATENT OFFICE.

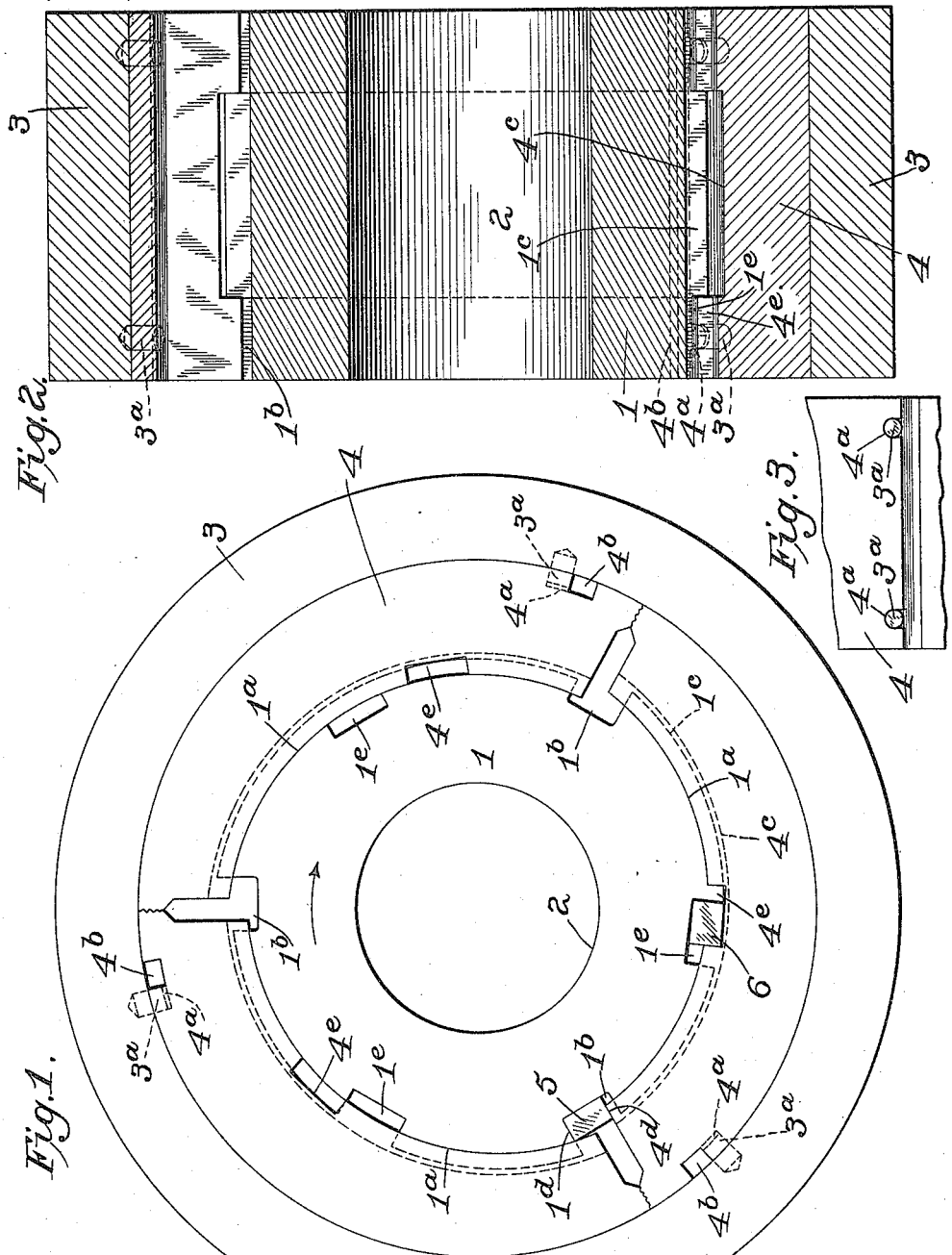

BRUCE W. TRAYLOR, OF ALLENTOWN, PENNSYLVANIA, ASSIGNOR TO TRAYLOR ENGINEERING AND MANUFACTURING CO., OF ALLENTOWN, PENNSYLVANIA, A CORPORATION OF DELAWARE.

CRUSHER-ROLL.

1,162,892.  Specification of Letters Patent.  Patented Dec. 7, 1915.

Application filed March 5, 1915. Serial No. 12,341.

*To all whom it may concern:*

Be it known that I, BRUCE W. TRAYLOR, a citizen of the United States, residing at Allentown, Pennsylvania, have invented certain new and useful Improvements in Crusher-Rolls, of which the following is a specification.

My present invention relates to improvements in crushing rolls such as are used for crushing rock, ore and the like, which work under great pressure, being forced usually toward each other by heavy springs acting upon sliding bearings supporting one of the rolls, such rolls are usually used for crushing extremely hard rock and ore and as the tires are subjected to excessive wear it is necessary to replace them from time to time. The steel or iron which is used for the tires of such crushing rolls, when in operation and working under the great pressure above referred to has a tendency to "flow" and the tires to become loose on the hearts and in all devices heretofore used for holding the tires in place, of which I am aware, it has been necessary to stop the operation of the machine and to tighten up the bolts or drive in wedges in order to tighten the tires. This requires considerable time and when the machine is running in a large mill frequently means the closing down of the complete plant with consequent material loss.

The object of the present invention is to provide a crushing roll having means by which the tire may be readily applied thereto and changed thereon when necessary and which will be held in place and automatically held tight when in use.

With these and other objects in view which will hereinafter appear, the invention includes the novel features of construction and arrangement and combination of parts defined by the appended claims; an embodiment of my invention being described in the following specification with reference to the accompanying drawings, in which;

Figure 1 is a side elevation of a crusher roll. Fig. 2 is a central transverse section, and Fig. 3 is a sectional detail.

Referring by reference characters to this drawing, the numeral 1 designates a roll heart which is provided with a central aperture 2 to receive the carrying shaft (not shown) to which it may be secured in the ordinary or any desired manner, this forming no part of the present invention. This roll heart has its exterior face non-circular in cross section, said exterior face being preferably formed in the shape of a plurality of stepped cam surfaces $1^a$.

3 designates the tire and between the tire and the roll heart is interposed a divided cam ring 4 having a circular outer face conforming to the inner face of the tire and a non-circular inner face conforming to the exterior face of the roll heart. In the embodiment of my invention shown in the drawings, I have illustrated the roll heart as provided with three eccentric or stepped cam faces and the divided cam ring as comprising three sections having their inner faces eccentric to the axis of the heart to the same degree as are the exterior cam faces of said heart. Power to rotate the roll heart being applied to turn it in the direction indicated by the arrow (Fig. 1), it will be readily seen the tendency is to continually maintain the tire wedged fast upon the roll heart through the cam ring 4 interposed between the tire and roll heart, and should the tire tend to become loose through wear or the "flow" of the metal hereinbefore referred to relative circumferential movement of the cam ring under the turning strain will immediately and automatically tighten the tire.

To prevent any slipping of the tire in connection with the divided cam ring, I provide the tire with lugs or projections in the shape of dowel pins $3^a$, which rest in recesses $4^a$ in the cam ring. These recesses $4^a$ preferably communicate with transverse slots $4^b$ in the cam ring which enables the tire and cam ring to be assembled by a lateral movement of the projecting portions of the dowel pins $3^a$ in the slots $4^b$ until they are in alinement with the recesses $4^a$ into which they are seated by a relative rotary movement of the tire and cam ring. In order to hold the cam ring and roll heart in perfect alinement, I prefer to provide the roll heart with an annular raised portion or projection $1^c$, and the cam ring with a corresponding recessed portion indicated at $4^c$.

In order to provide for the initial tightening of the tire upon the roll heart prior to starting the work, I provide recesses 1ᵇ at the point where the low portion of one cam face adjoins the high portion of the other cam face; into one or more of said recesses a wedge 5 may be driven abutting on one side against the shoulder 1ᵈ of the roll heart and on the other side against the shoulder 4ᵈ of the cam ring. The driving in of this wedge will produce relative circumferential movement of the roll heart and cam ring, thus resulting in the initial tightening of the tire. In order to effect the unlocking of the parts to permit removal and replacement of the tire, I provide the roll heart with other recesses 1ᵉ and the cam ring with recesses 4ᵉ, these enabling the driving in of a wedge as indicated at 6 which by its action against the opposing walls of the recesses 1ᵉ and 4ᵉ will effect relative circumferential movement of the roll heart and the cam ring in the reverse direction to loosen the tire and permit its removal. A plurality of sets of these recesses 1ᵉ and 4ᵉ are provided, which as shown in Fig. 1, are more or less out of alinement with each other and by this relative arrangement as the tire works around upon the cam ring in its self-adjustment process at least one pair of recesses will always be sufficiently in alinement to enable a wedge to be inserted for loosening the cam ring.

What I claim is:—

1. A crusher roll comprising a roll heart having a non-circular exterior face, a tire, and a divided cam ring interposed between said roll heart and tire.

2. A crusher roll comprising a roll heart having a non-circular exterior face, a tire, a divided cam ring interposed between said roll heart and tire, and interlocking connections between said tire and cam ring.

3. A crusher roll comprising a roll heart having a non-circular exterior face, a tire, a divided cam ring interposed between said roll heart and tire, and interlocking connections between said tire and cam ring comprising one or more transverse grooves provided with laterally extending recesses formed in one of said parts and pins or projections carried by the other part adapted to be seated in said recesses.

4. A crusher roll comprising a roll heart having its exterior surface in the shape of a stepped cam, a tire, and a sectional cam ring interposed between said tire and roll heart and having the inner faces of its sections corresponding to the eccentric faces of said roll heart.

5. A crusher roll comprising a roll heart having its exterior surface in the shape of a stepped cam, a tire, a divided cam ring interposed between said roll heart and tire and having its inner surface in the shape of a stepped cam corresponding to the exterior surface of the roll heart, said roll heart having in proximity to the adjoining portions of two of its cam surfaces a recess to permit the insertion of a tightening wedge, substantially as described.

6. A crusher roll comprising a roll heart having its exterior surface in the shape of a stepped cam, a tire, a divided cam ring interposed between said roll heart and tire and having its inner surface in the shape of a stepped cam corresponding to the exterior surface of the roll heart, said roll heart and said cam ring having overlapping recesses to permit the insertion of a loosening wedge, substantially as described.

7. A crusher roll comprising a roll heart having its exterior surface in the shape of a stepped cam, a tire, a divided cam ring interposed between said roll heart and tire and having its inner surface in the shape of a stepped cam corresponding to the exterior surface of the roll heart, said roll heart and said cam ring having a plurality of pairs of coöperating recesses with radial walls, the recesses of different pairs being arranged at different distances apart, substantially as described.

In testimony whereof, I affix my signature in presence of two witnesses.

BRUCE W. TRAYLOR.

Witnesses:
 ELLA M. SNYDER,
 E. M. MOYER.

Copies of this patent may be obtained for five cents each, by addressing the "Commissioner of Patents, Washington, D. C."